Jan. 27, 1970   J. E. BAILEY   3,491,593
MAGNETIC FLOWMETER REFERENCE SYSTEM
Filed Jan. 26, 1968   7 Sheets-Sheet 7

INVENTOR.
JOHN E BAILEY
BY
AGENT

Jan. 27, 1970  J. E. BAILEY  3,491,593
MAGNETIC FLOWMETER REFERENCE SYSTEM
Filed Jan. 26, 1968  7 Sheets-Sheet 3

INVENTOR.
JOHN E. BAILEY
BY
Lawrence H. Poston
AGENT

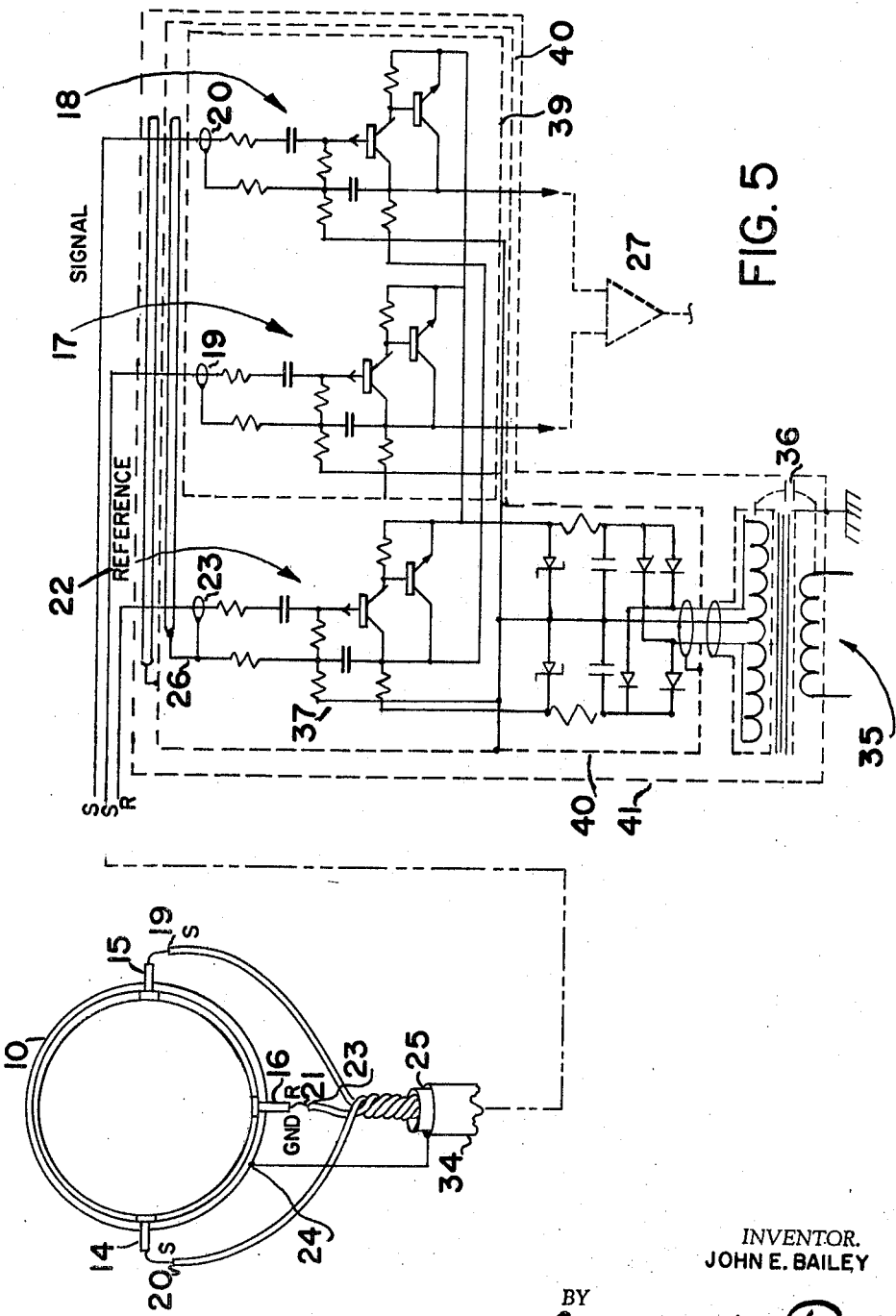

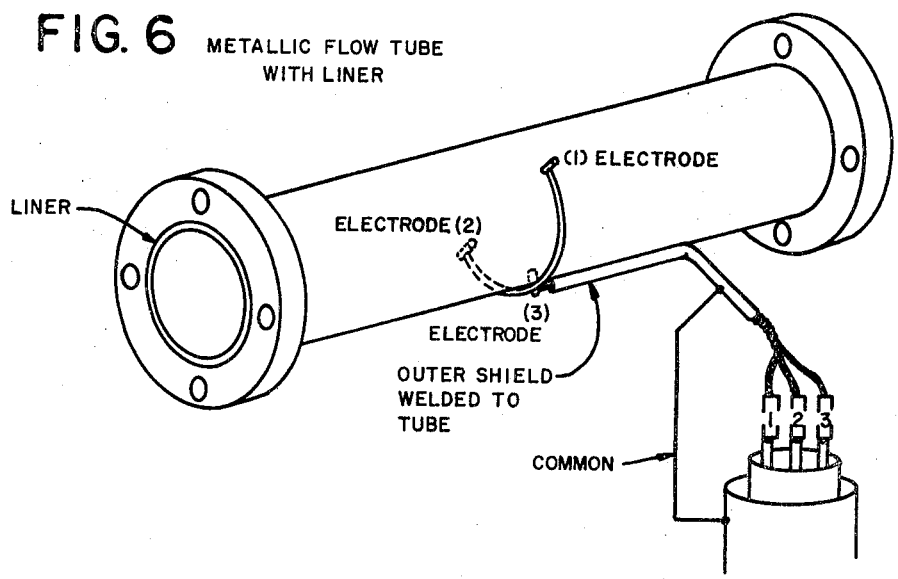
FIG. 6 METALLIC FLOW TUBE WITH LINER
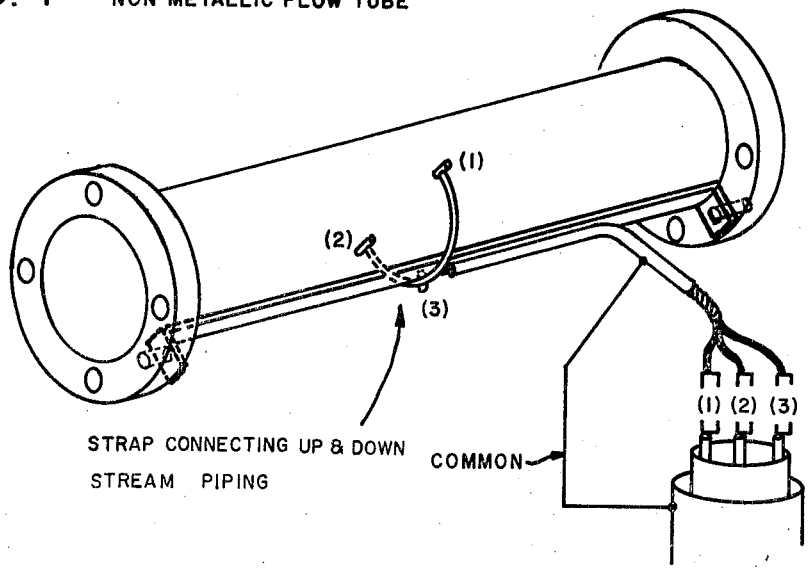
FIG. 7 NON METALLIC FLOW TUBE
INVENTOR.
JOHN E BAILEY
BY
Lawrence H. Poeton
AGENT

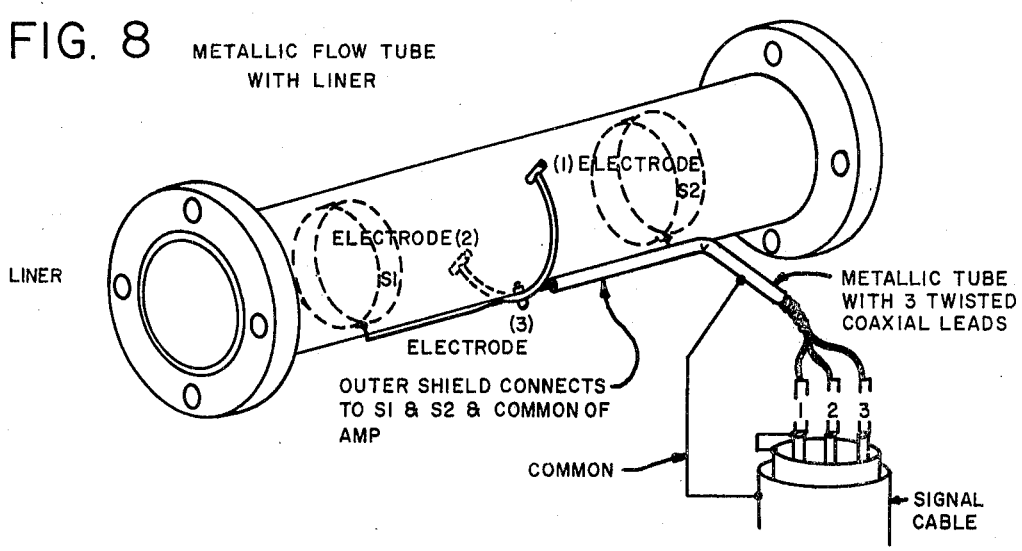
FIG. 8 — METALLIC FLOW TUBE WITH LINER
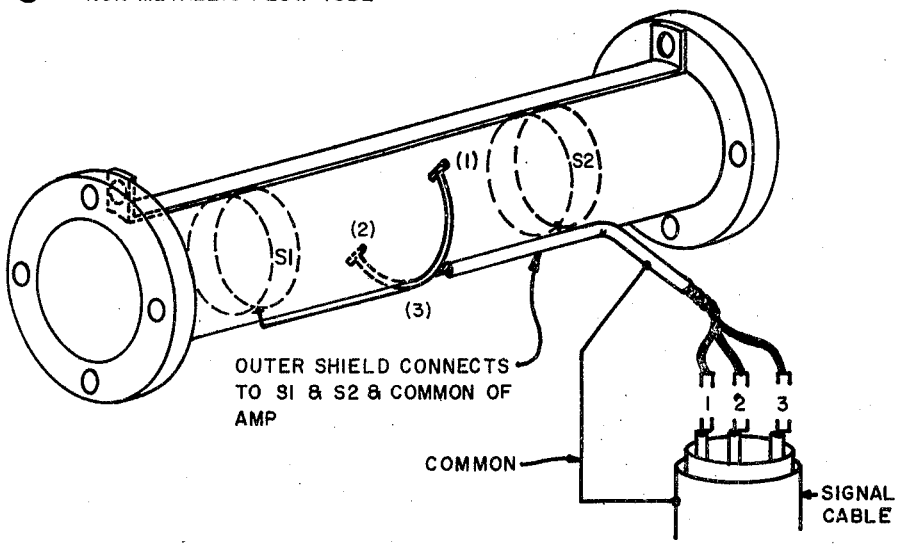
FIG. 9 — NON METALLIC FLOW TUBE
INVENTOR.
JOHN E BAILEY Jan. 27, 1970  J. E. BAILEY  3,491,593
MAGNETIC FLOWMETER REFERENCE SYSTEM
Filed Jan. 26, 1968  7 Sheets-Sheet 7

INVENTOR.
JOHN E BAILEY
BY
*Lawrence H. Poston*
AGENT

`United States Patent Office`

3,491,593
Patented Jan. 27, 1970

3,491,593
MAGNETIC FLOWMETER REFERENCE SYSTEM
John E. Bailey, Needham, Mass., assignor to The Foxboro Company, Foxboro, Mass., a corporation of Massachusetts
Filed Jan. 26, 1968, Ser. No. 700,892
Int. Cl. G01p 5/08
U.S. Cl. 73—194                                                 10 Claims

ABSTRACT OF THE DISCLOSURE

For use in magnetic flowmeter measurement of fluids of low conductivity or other situations wherein precision measurements are difficult, a magnetic flowmeter reference system wherein the reference system is established as a true reference without drawing significant current, this system comprising a non-inverting impedance converter, with a driven voltage shielded reference input. Refinement can be obtained by adding power line and reference current isolation system to this converter, and further refinement by adding a by-pass and ground system for electrical current in the fluid to be measured, and/or undesirable voltage conditioning in the pipe line carrying the fluid to be measured.

---

This invention relates to electromagnetic flowmeters. In particular, this invention relates to the electrical signal output of such flowmeters and to reference system means therefor.

An electromagnetic flowmeter, also commonly referred to as an induction flowmeter, typically includes a metal pipe section which carries the fluid whose flow rate is being measured, an electrically insulating liner in this section, means for producing a magnetic field in the pipe transversely of the direction of fluid flow, and a pair of signal electrodes in contact with the fluid and positioned in the pipe on a line transverse to both the direction of magnetic flux and the direction of fluid flow. In accordance with known electromagnetic principles, movement of the fluid in the pipe generates between the electrodes a voltage the magnitude of which is a function of the rate of flow. The voltage so generated may, after amplification to a suitable power level, be used to operate one or more of a variety of indicating, recording, or flow controlling devices.

It is necessary that the fluid to be measured be electrically conductive. Above a certain level of such conductivity, measurement may be made by relatively simple flowmeters.

However, in the field of fluids of low conductivity, in order to isolate the signal from various "noise" effects, common system current effects, and circuit and fluid conditions which tend to draw current through the signal electrodes thus introducing error in the voltage measurement, it is necessary to provide new and sophisticated flowmeter systems, particularly in the area of signal reference systems, in order to provide instrumentation capable of properly handling this especially difficult field of flow measurement.

This invention provides such new systems, for example, for the following purposes. An ordinary reference connection may be only indirectly connected to the measured fluid. This invention provides an isolated reference electrode, directly in contact with the measured fluid. Such an electrode needs to provide a voltage signal only, and if current is drawn through its circuit, error is introduced. Various electro-chemical interface effects between the reference electrodes result from such current flow, to introduce the voltage error. The electro-chemical effects are only theoretically and partially understood, but their result is the production of signal error.

Further, undue capacity effects with respect to a reference output connection lead, and/or a low impedance input system for that lead, can cause current to be drawn through the reference electrode. This invention improves these situations by providing the output of the reference electrode with a high input impedance non-inverting amplifier operating as an impedance converter, high-to-low impedance, wherein the signal voltage remains significantly unchanged, and yet the output of the converter is suitable for application to further circuit elements. Output from the converter is applied to a driven shield around the reference electrode lead to maintain the shield essentially at the voltage of the reference electrode output lead, thus minimizing capacity effects in this area.

Further, various current drawing situations may exist in that the often-necessary power supply systems do not lend themselves to sufficient shielding to avoid a capacitive effect across the primary-secondary of an input transformer. Also, with the magnetic flowmeter transmitter (flow pipe area) and other units of the instrumentation often separated by substantial distances, ten feet or more, the potential at the transmitter and that at the power supply and/or the amplifier-recorder units, may be significantly different. This means that a loop or circuit exists between these differing potentials, and the current drawn has its error effect on the reference electrode so that a true reference voltage is not obtained. This invention provides means for obtaining these situations by isolating this current loop and the power supply error producing currents. This is done by applying the same reference to the input and the output of the reference electrode amplifier.

Finally, at the transmitter (flow pipe and electrode area) there are possibilities of error which this invention contemplates and obviates when needed. In the arrangement of the signal electrodes, a plane essentially transversely perpendicular to both the magnetic flux and the measured flow is established. The reference electrode needs to be in or near this plane. Small errors may be compensated for by the common mode effect known in the use of differential amplifiers for signal electrode outputs. It is however, preferable to avoid placing this usually unnecessary burden on the differential amplifier. In any case, this burden must be within the common mode capability of the differential amplifier system. Other reference situations occur, and this invention provides means for handling them if and when they do.

For example, since the reference system herein uses an amplifier, there must be a reference for the reference system. Ordinarily it is enough to provide a simple ground connection to a metal flow pipe. It may be desirable, however, to use upstream and downstream fluid contact rings, electrically connected and with a ground tap taken essentially in the plane of the signal reference electrodes. In the event of possible heavy electric currents in the flow pipe, an additional upstream-downstream by-pass connection may be provided, with a connection to earth-ground and no connection to the flow-meter circuitry. This may be in the form of upstream-downstream fluid contact rings or flanges, electrically connected together. Electrical connector straps may be used from upstream to downstream conductive pipe where the flowmeter is itself non-conductive.

The degree of sophistication of such ground and reference systems is dependent on the particular parameters of specific situations. This invention provides the necessary systems for the necessary result, according to the need, in a fashion which is in combination unique, useful and non-obvious.

There has been difficulty involved in the use of magnetic flow heads. "Electrode contamination" has been a phrase used to describe performance errors which result not only in the field but during construction and calibration.

A metallic electrode seems not a resistive contact with the fluid but is, in fact, mainly a capacitive connection (when considered at line frequency). This capacitive connection proves to be very unstable in magnitude, being affected by time, temperature, galvanic potentials, electrochemical composition of the stream, etc.

Incorporation of the reference electrode system of this invention minimizes errors due to: ground currents; mechanical structure shifts; inadequate grounds provided by a user; and zero shift caused by electrode-contamination shift of magnetic null. A significant improvement in accuracy, may in many cases result from the use of such a reference system.

A major problem of readout occurs in the magnetic flow head in that the voltage to be measured appears between two high impedance electrodes, neither of which are capable of carrying currents without objectionable potential drops. Any single ended amplifier presents a current to at least one electrode. A very high impedance differential amplifier will not load either electrode but requires a common reference related to the electrode signal (a fluid reference connection). The current, capacitive or resistive, which flows in the common lead produces a potential drop through the fluid connection which must be held within the latitude and common-mode capabilities of the differential amplifier if errors are to be held within acceptable limits. For this reason, the common lead or fluid connection must be kept free of extraneous currents. Even where the pipe line is metallic, the fluid connection is significantly resistive such that small currents produce significant potentials. One magnetic flow metering approach to this problem is to tie all grounds together, fluid ground, instrument ground, power ground, pipe ground, conduit ground, etc. in such a manner as to provide minimum and/or acceptable pick-up. In some cases this is an installation problem; additionally, in many cases the acceptable condition becomes objectionable in service due to changes in the grounding system (interface fluid changes, metallic junction effects, etc.)

This invention incorporates a third electrode in the plane of the measuring electrodes to be used to provide a common potential reference for the differential amplifier. It utilizes a non-inverting third amplifier with a high point input impedance to read out the true potential of the reference electrode. The reference for this third amplifier may be the normal metallic pipe up and downstream. If a three-channel amplifier with good isolation is used, the two measuring electrodes and the reference electrode can be free of currents producing objectionable potential drops in the measuring circuit. Any potential drops in the return of the three-channel amplifier to fluid ground will be common to both input and output of the third channel and will not be seen by the true differential amplifier. The output of the third channel, the common of the differential amplifier, will be the true reference electrode potential. Where lined or non-metallic pipe line is used and the fluid is highly corrosive, two additional small electrodes can be used, one placed upstream, and the other downstream of the measuring electrodes. These two additional electrodes may be connected together to provide the fluid return path for the three-channel preamplifier.

Other objects and advantages of this invention will be in part apparent and in part pointed out hereinafter and in the accompanying drawings, in which:

FIGURE 1 is an illustration of a magnetic flowmeter as a general stripped-down showing, to indicate the usual main structures of such a device;

FIGURE 5 is a wiring diagram of an example of this invention, in elaboration of the block diagram of FIGURE 4;

FIGURES 6 through 11 are illustrations of various forms of ground systems according to this invention, in the sense of the ground being a reference for the reference electrode-amplifier combination according to this invention.

In this specification, as follows, the general structure and principle of magnetic flowmeter operation as illustrative support for this invention, is set forth in FIGURES 1 through 3.

FIGURES 4 through 7 relate to the central circuitry as embodiments of this invention.

FIGURES 8 through 13 illustrate various forms of ground systems as combinations of this invention.

In FIGURE 1, certain major portions of the magnetic flowmeter include the flow pipe 10, field coils 11 for setting up the magnetic field within the pipe 10, suitable core members 12 for the field coils 11, and an indication 13 of a location of one of the electrodes of the device.

Figure 2:
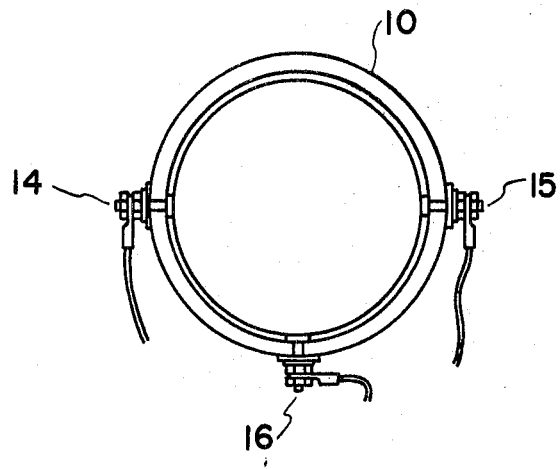
FIGURE 2 is a cross-section of flowmeter signal electrode and reference electrode location situation according to this invention.

FIGURE 2 is a transverse showing of a flowmeter like that of FIGURE 1, in the plane of the electrodes and parallel to the magnetic lines of the flowmeter according to this invention. In the flow pipe 10, signal output electrodes 14 and 15 are oppositely disposed, and a reference electrode 16 is located midway between the signal electrodes.

Figure 3:
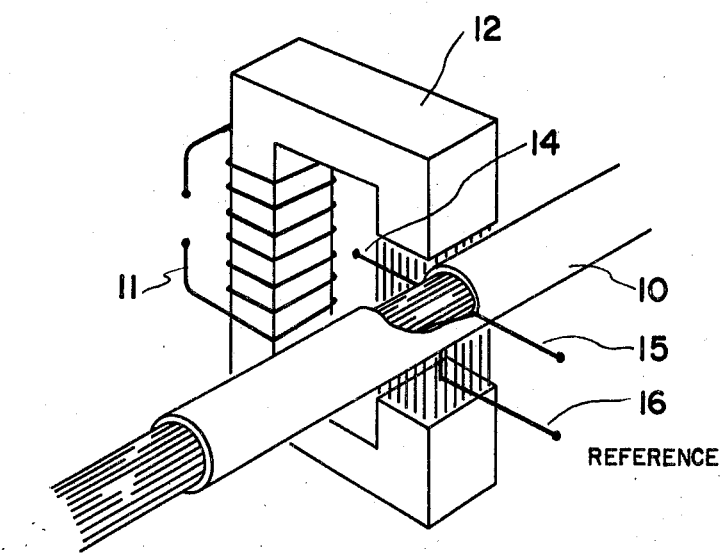
FIGURE 3 is a functional illustration of the principle of magnetic flowmeter operation, indicating the location of the reference electrode in accordance with this invention.

FIGURE 3 illustrates the location of the reference electrode 16 in the functional magnetic flowmeter system. The equivalent elements of FIGURE 3 and of FIGURES 1 and 2, are provided with the same reference numbers. Thus in FIGURE 3 it is seen that the general operation of the flowmeter is based on Faraday's law of electromagnetic induction. The voltage induced in the flowing fluid as a moving conductor moving through the magnetic field, is proportional to the velocity of the conductor. The voltage is generated in a plane which is manually perpendicular to both the velocity of the conductor and the magnetic field.

In the circuitry showings of FIGURES 4 through 7, FIGURE 4 is a skeletal and block diagram presentation. Each of the signal electrodes is led into an amplifier unit individual to it, as at 17 and 18. These amplifiers are high input impedance devices designed and functioning as non-inverting impedance converters which deliver an output voltage effectively the same as the voltage input thereto, although slightly less. Consequently, with respect to the impedance condition, effectively no current is drawn through the electrodes 14 or 15. Each of the leads from the signal electrodes 14 and 15 is provided with an electrical shield as at 19 and 20, and these leads have output connections from their amplifiers 17 and 18 to provide driven shields for these leads, at the voltages of their respective electrodes. These driven shields are used to minimize the signal attenuation to lead capacity by keeping the voltage between them at a minimum. Thus any current drawn through the signal electrodes due to such capacities is minimal.

The necessary reference voltage for the amplifiers 17 and 18 is provided by a reference system including the reference electrode 16. An output lead 21 therefrom is an input to a reference amplifier 22. This amplifier is also a non-inverting impedance converter with high input impedance, with an output voltage effectively the same as the input, and with an output connection to a lead shield 23. Thus, in these areas of possible trouble, current drawn through the reference electrode is minimal. The reference amplifier 22 is provided with its own necessary reference, a connection to the flow pipe at 24. Further discussion of this particular connection is provided later herein. A special overall shield 25 covers all three electrode shields and is driven by the output of the reference amplifier 22 to the voltage of the reference electrode 16, through connection 26 from the driven shield 23. Connection 26 is illustrated in FIGURES 4 and 5.

Figure 4:
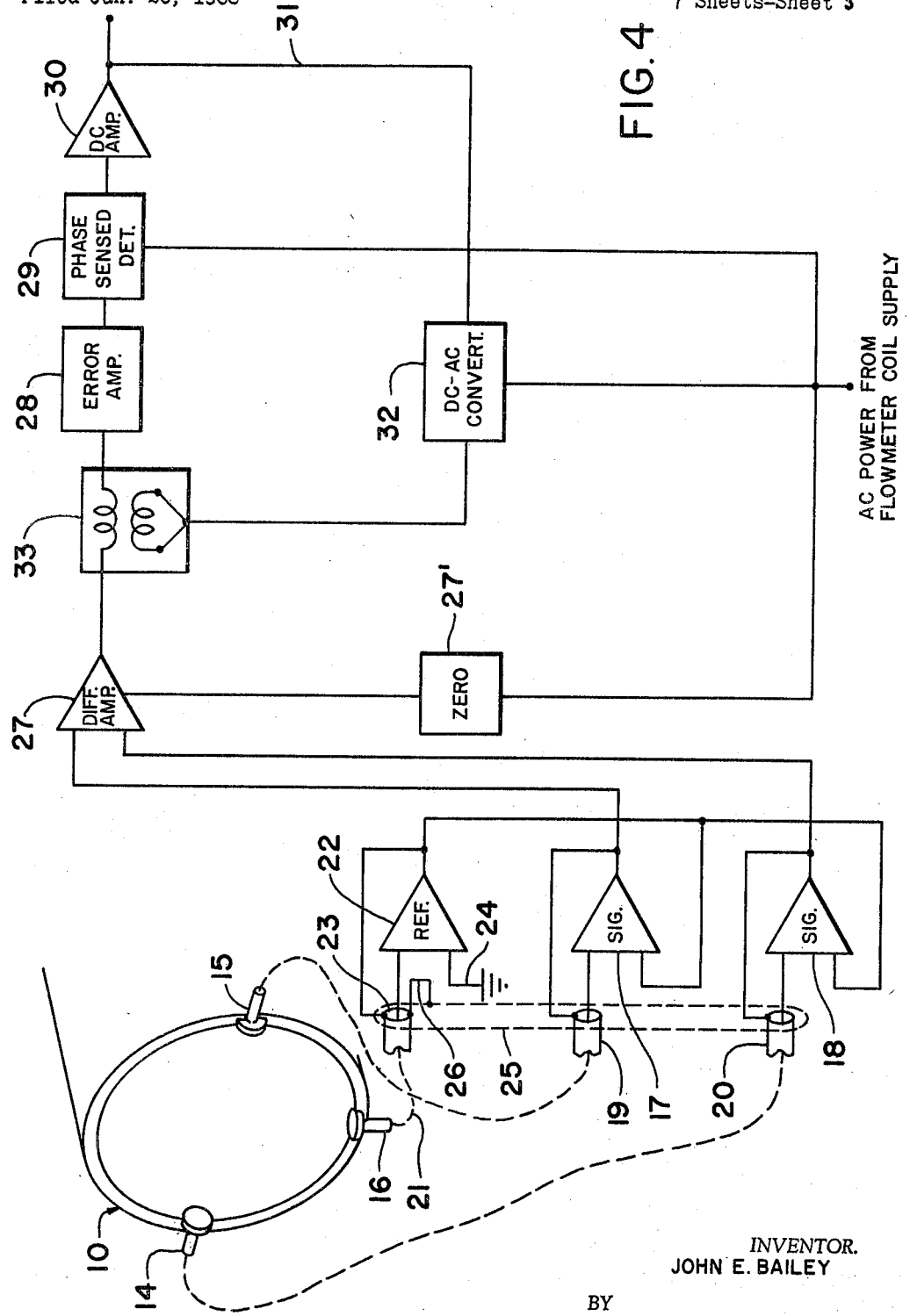
FIGURE 4 is a block diagram of an electrode system according to this invention, as it is applied to a customary flowmeter circuit.
Figure 10:
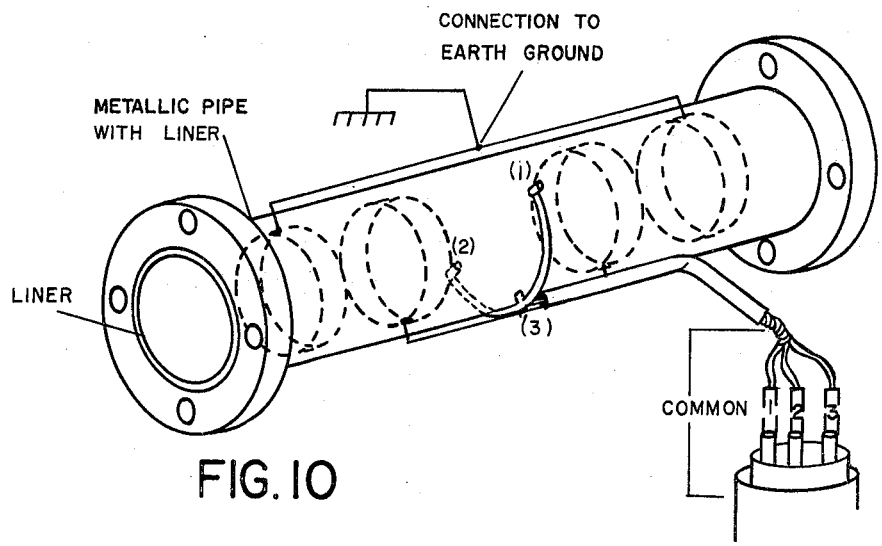
Figure 11:
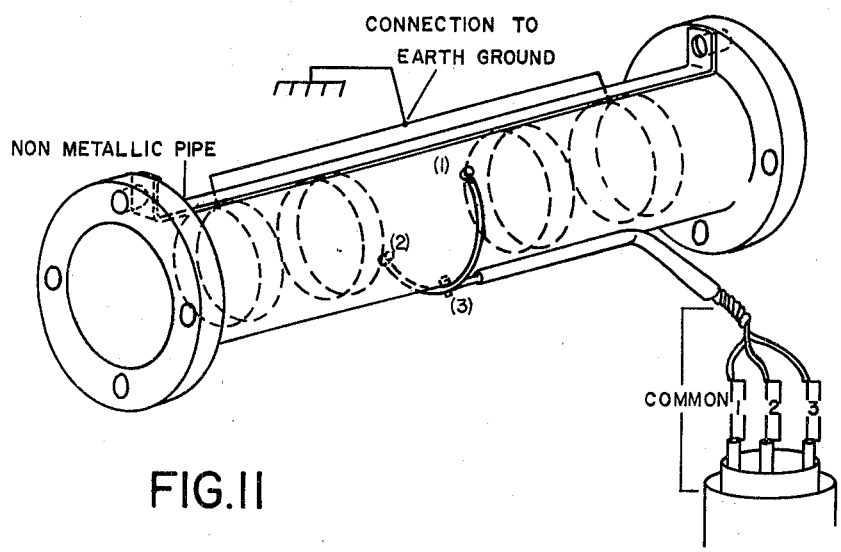

The output of the referencce amplifier of FIGURE 4 is a common input reference lead 21 into the signal amplifiers 17 and 18. Thus the signal amplifiers are provided with an essentially pure reference, since minimal current is drawn through the reference electrode 16.

The outputs of the FIGURE 4 signal amplifiers 17 and 18 input to a differential ampifier 27 and then into one form of output system which may comprise an error signal differential amplifier 28, then a phase sensed detector 29 to a D.C. amplifier 30, with a feedback 31 through a D.C.–A.C. converter 32, and to a transformer 33 for opposition to the flow signal in the output of the differential amplifier 27. A zero correction unit 27' is provided for the differentital amplifier 27.

FIGURE 5 illustrates a further shield 34, encompassing the electrode shield 19, 20, 23 and 25. This is connected to the flowmeter pipe 10 at 24.

The electrode signal and reference non-inverting amplifiers are detailed in FIGURE 5 as identical units 17, 18 and 22 with their high input impedance and driven shield feedback arrangements, and such that their output impedances are low.

The reference amplifier 22 is distinctive and uniquely operative in its use. If not only drives the shield 23 around the reference lead, but it also drives, to essentially the same voltage, the shield 25 which brings the reference closely around the signal shields 19 and 20, as well.

A further unique distinction of the reference amplifier unit 22 as shown in FIGURE 5, is that, in combination with the power supply 35 and the common system, it provides isolation of the reference system from possible current flow in the common system, which otherwise would result in current flow through the reference electrode with its consequent error result. This circuit occurs through the capacity effect 36, across the power transformer, and because the potential at the transmitter may be different than that at the power supply of the instrument itself.

The isolation effect is achieved by connecting the common of the transformer power input to the reference amplifier 22. This is done at the input to the amplifier at 37. The effect is that the output of the reference amplifier is at the fluid voltage of the reference electrode, relative to absolute.

Further FIGURE 5 shielding is as follows. The signal amplifiers 17 and 18 are enclosed by and electrically tied to an inner shield 39. The shield 39 and the reference amplifier 22 are enclosed by and electrically tied to an intermediate shield 40, which is tied to the flow transmitter pipe at 24. Finally, the outer shield 41 encloses the whole amplifier system and is tied to the local power ground, as at the power input transformer.

In the following discussion of FIGURES 6 through 11, variants of the reference system are set forth. In each case, the two signal electrodes, the reference electrode and the system of FIGURE 5, remain the same. These figures show variants of FIGURE 5 connection 24, with associated by-pass and earth ground connections.

FIGURES 6 and 7 are three electrode systems where the common is obtained by connection to up and downstream pipe or by fill plates at the pipe connection flanges.

FIGURES 8 and 9 are three electrode systems plus fluid connection for the common which is independent of the piping. By-pass for axial current is provided by up and down-stream piping connection strap or by full bore plates at the flanges.

Figure 10:
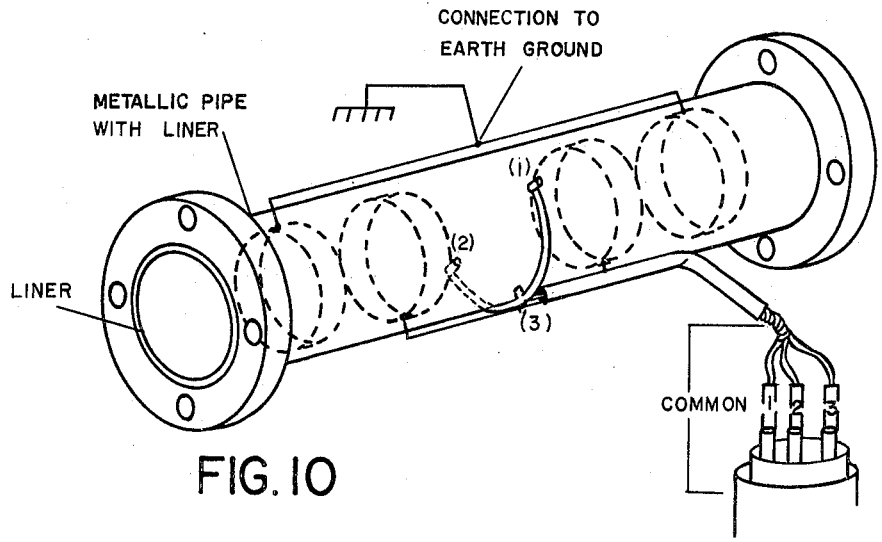
Figure 11:
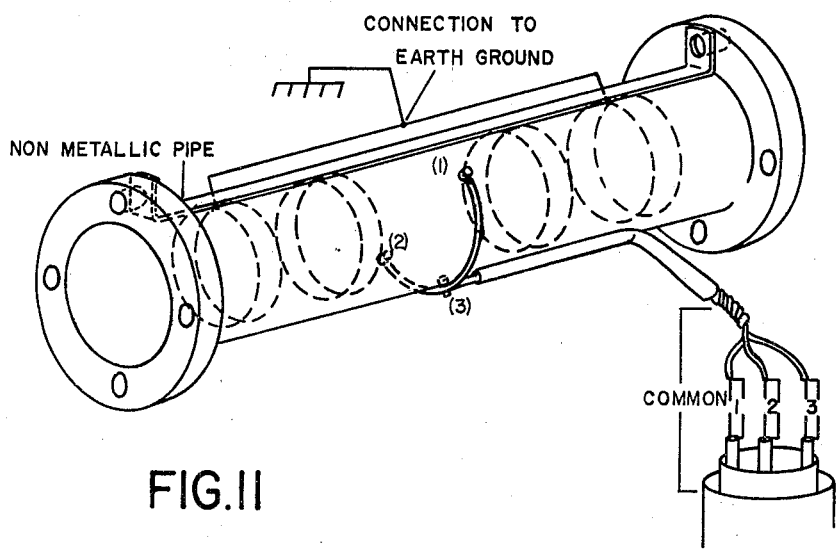

FIGURES 10 and 11 are three electrode systems with fluid connection for the common independent of the piping, plus a guard shield connection to earth ground to handle heavy pipe line electrical currents.

Direct fluid contact is often desirable, and further extensions of the same contact and by-passes may be added as needed.

This invention therefore provides a new and useful reference system concept for magnetic flowmeters.

I claim:

1. A magnetic flowmeter electrode system wherein fluid flow-responsive signal voltage is provided through signal electrodes in contact with said fluid, means tending to eliminate electrical current flow through said electrodes comprising non-inverting impedance converter means to which said signal electrode voltage is applied, signal input leads from said signal electrodes to said converter means, shields about said signal leads, and electrical connections from the outputs of said converter means to said signal input lead shields, in combination with reference electrode means also in contact with said fluid, a non-inverting reference impedance converter for said reference electrode, an input lead from said reference electrode to said reference impedance converter, a shield for said reference lead, and an electrical connection from said reference impedance converter output to said reference input shield, with the output of said reference impedance converter connected as a reference to said signal impedance converter means.

2. A magnetic flowmeter system according to claim 1 wherein the signal electrodes and the reference electrode are all located in essentially the same plane with said plane perpendicular to said fluid flow and perpendicular to the direction of magnetic flux in said system.

3. A system according to claim 1 wherein said signal leads and shields and said reference lead and shield are all enclosed in an intermediate shield electrically connected to said reference shield whereby said intermediate shield and said reference lead shield are essentially at the same potential.

4. A system according to claim 3 wherein said intermediate shield is enclosed in an outer shield, with a connection from said outer shield to a ground at the flowmeter.

5. A system according to claim 4, wherein said signal impedance converter means is enclosed in an inner shield housing, said reference impedance converter means and said inner shield housing are enclosed in a middle shield housing which is also connected to said outer shield as tied to said ground at said flowmeter, and said middle shield housing is enclosed in an outside shield housing, with electrical power supply means local to said converters, said last named housing being grounded at the power ground of said local supply means.

6. A system according to claim 1 including current flow isolation means as an electrical connection applied to the input of said reference impedance converter from the secondary of an electrical power supply transformer in a power supply local to said converters.

7. A system according to claim 1 wherein said reference means and said electrodes lie effectively and essentially within a single plane perpendicular to the flow of fluid in said magnetic flowmeter, and to the magnetic flux of said system.

8. A system according to claim 1, said reference means comprising upstream and downstream fluid contact means connected to each other and tapped off at an intermediate point to connect to said reference converter.

9. A system according to claim 1, said reference means comprising upstream and downstream fluid contact means connected to each other and tapped off to earth ground connection to prevent heavy electrical current flow in the fluid being measured in said flowmeter.

10. In a magnetic flowmeter system, an electrode system comprising two signal electrodes and a reference electrode, a non-inverting impedance converter for each of said electrodes, individually driven shielded connections between each of said electrodes and their respective impedance converters, another shield, disposed about all of said shielded connections together and connected to the shield of said reference electrode and driven by the impedance converter related to said reference electrode, an output connection from said reference impedance converter as a common input to said signal impedance converters, a differential amplifier, and output connections from said signal impedance converters as the inputs to said differential amplifier.

References Cited

UNITED STATES PATENTS

| | | | |
|---|---|---|---|
| 2,733,604 | 2/1956 | Coulter | 73—194 |
| 3,263,500 | 8/1966 | Krishnaswamt et al. | 73—194 |
| 3,339,410 | 9/1967 | Stern | 73—194 |

CHARLES A. RUEHL, Primary Examiner